United States Patent
Quach et al.

(10) Patent No.: US 7,562,901 B2
(45) Date of Patent: Jul. 21, 2009

(54) INFLATABLE CURTAIN MODULE WITH PUSH-IN FASTENER

(75) Inventors: Thanh H. Quach, Macomb, MI (US); Mike P. Pionk, Marysville, MI (US); Ali Emam Bakhsh, Rochester Hills, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 11/789,011

(22) Filed: Apr. 23, 2007

(65) Prior Publication Data

US 2008/0258445 A1 Oct. 23, 2008

(51) Int. Cl.
*B60R 21/16* (2006.01)

(52) U.S. Cl. ................................. 280/730.2

(58) Field of Classification Search .............. 280/730.2, 280/728.2
See application file for complete search history.

(56) References Cited

U.S. PATENT DOCUMENTS

| | | | | |
|---|---|---|---|---|
| 4,728,238 A | * | 3/1988 | Chisholm et al. | 411/510 |
| 5,934,729 A | * | 8/1999 | Baack | 296/39.1 |
| 6,431,585 B1 | * | 8/2002 | Rickabus et al. | 280/728.3 |
| 6,793,241 B2 | * | 9/2004 | Wallner et al. | 280/730.2 |
| 6,889,999 B2 | * | 5/2005 | Dominissini et al. | 280/730.2 |
| 7,100,939 B2 | * | 9/2006 | Blake et al. | 280/728.2 |
| 7,338,068 B2 | * | 3/2008 | Kawai et al. | 280/728.2 |
| 2003/0205887 A1 | * | 11/2003 | Wallner et al. | 280/730.2 |
| 2005/0206135 A1 | * | 9/2005 | Nelson et al. | 280/728.2 |
| 2005/0285375 A1 | * | 12/2005 | Kawai et al. | 280/728.2 |
| 2006/0197316 A1 | * | 9/2006 | Watanabe | 280/728.2 |
| 2006/0197317 A1 | * | 9/2006 | Watanabe | 280/728.2 |
| 2007/0296184 A1 | * | 12/2007 | Oestergren | 280/728.2 |
| 2008/0014045 A1 | * | 1/2008 | Kawai | 411/45 |
| 2008/0061535 A1 | * | 3/2008 | Everard et al. | 280/728.2 |

FOREIGN PATENT DOCUMENTS

JP        10203288 A * 8/1998

* cited by examiner

*Primary Examiner*—Faye M. Fleming
(74) *Attorney, Agent, or Firm*—Tarolli, Sundheim, Covell & Tummino LLP

(57) ABSTRACT

An apparatus (10) helps to protect an occupant (28) of a vehicle (12) that has a side structure (16) and a roof (18). The apparatus (10) includes an inflatable vehicle occupant protection device (14). The protection device (14) is inflatable away from the vehicle roof (18) to a deployed condition positioned between the side structure (16) and a vehicle occupant (28). The apparatus (10) further includes a cover (44) for at least partially enclosing the protection device (14) in the stored condition. At least one push-in fastener (182) secures the cover (44) to the vehicle (12).

16 Claims, 3 Drawing Sheets

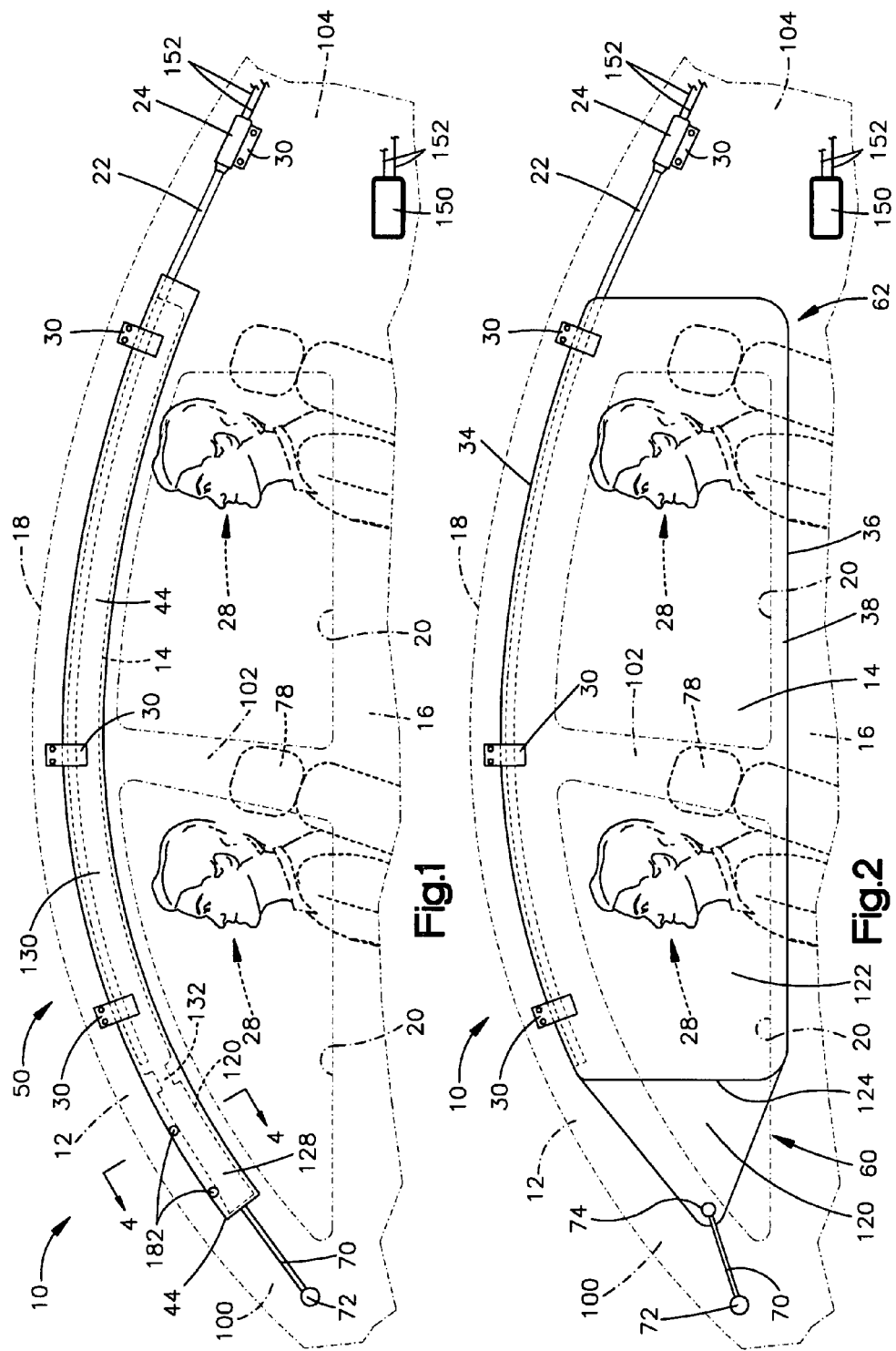

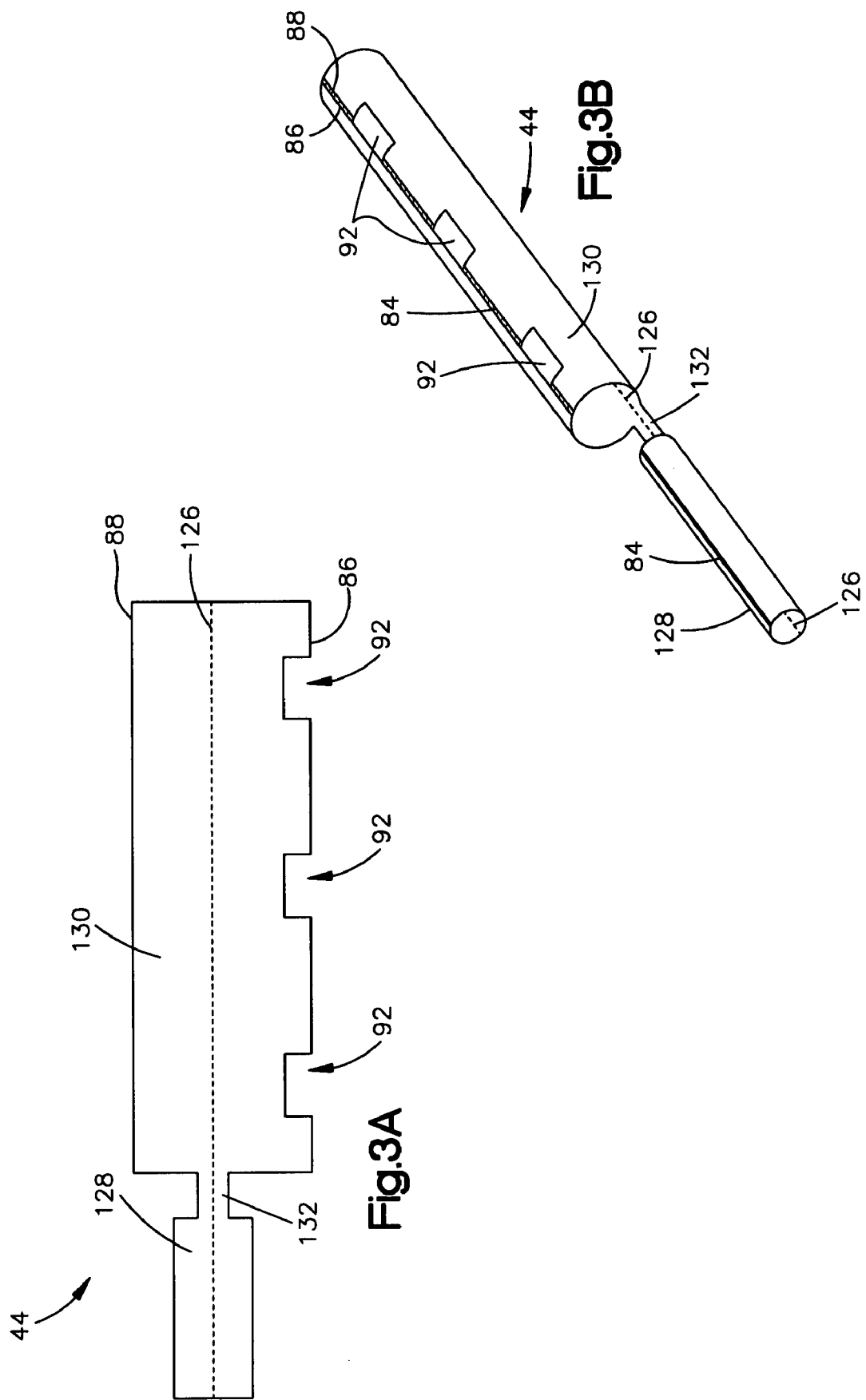

INFLATABLE CURTAIN MODULE WITH PUSH-IN FASTENER

TECHNICAL FIELD

The present invention relates to an inflatable vehicle occupant protection device for helping to protect an occupant of a vehicle.

BACKGROUND OF THE INVENTION

It is known to inflate an inflatable vehicle occupant protection device to help protect a vehicle occupant upon the occurrence of an event for which occupant protection is desired, such as a vehicle collision or rollover. One particular type of inflatable vehicle occupant protection device is an inflatable curtain. Inflatable curtains are inflatable away from a vehicle roof to a deployed position between a side structure of the vehicle and the vehicle occupant.

SUMMARY OF THE INVENTION

The present invention relates to an apparatus for helping to protect an occupant of a vehicle that has a side structure and a roof. The apparatus comprises an inflatable vehicle occupant protection device inflatable away from the vehicle roof from a stored condition to a deployed condition positioned between the side structure and a vehicle occupant. A cover is provided for at least partially enclosing the protection device in the stored condition. At least one push-in fastener secures the cover to the vehicle.

In accordance with another embodiment of the present invention, an apparatus is provided for helping to protect an occupant of a vehicle that has a side structure and a roof. The apparatus comprises an inflatable vehicle occupant protection device inflatable away from the vehicle roof from a stored condition to a deployed condition positioned between the side structure and a vehicle occupant. An inflation fluid source actuatable to provide inflation fluid inflates the protection device. A cover is also provided for at least partially enclosing the protection device in the stored condition. The cover comprises a sheet of material having opposite longitudinal edge portions interconnected by an ultrasonic weld to give the cover a tubular configuration.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic view illustrating a stored condition of an apparatus for helping to protect an occupant of a vehicle, according to the present invention;

FIG. 2 is a schematic view illustrating a deployed condition of the apparatus of FIG. 1;

FIG. 3A is a plan view of a cover portion of the apparatus;

FIG. 3B is an isometric view of the cover of FIG. 3A in an assembled condition.

DESCRIPTION OF EMBODIMENTS

Figure 4:
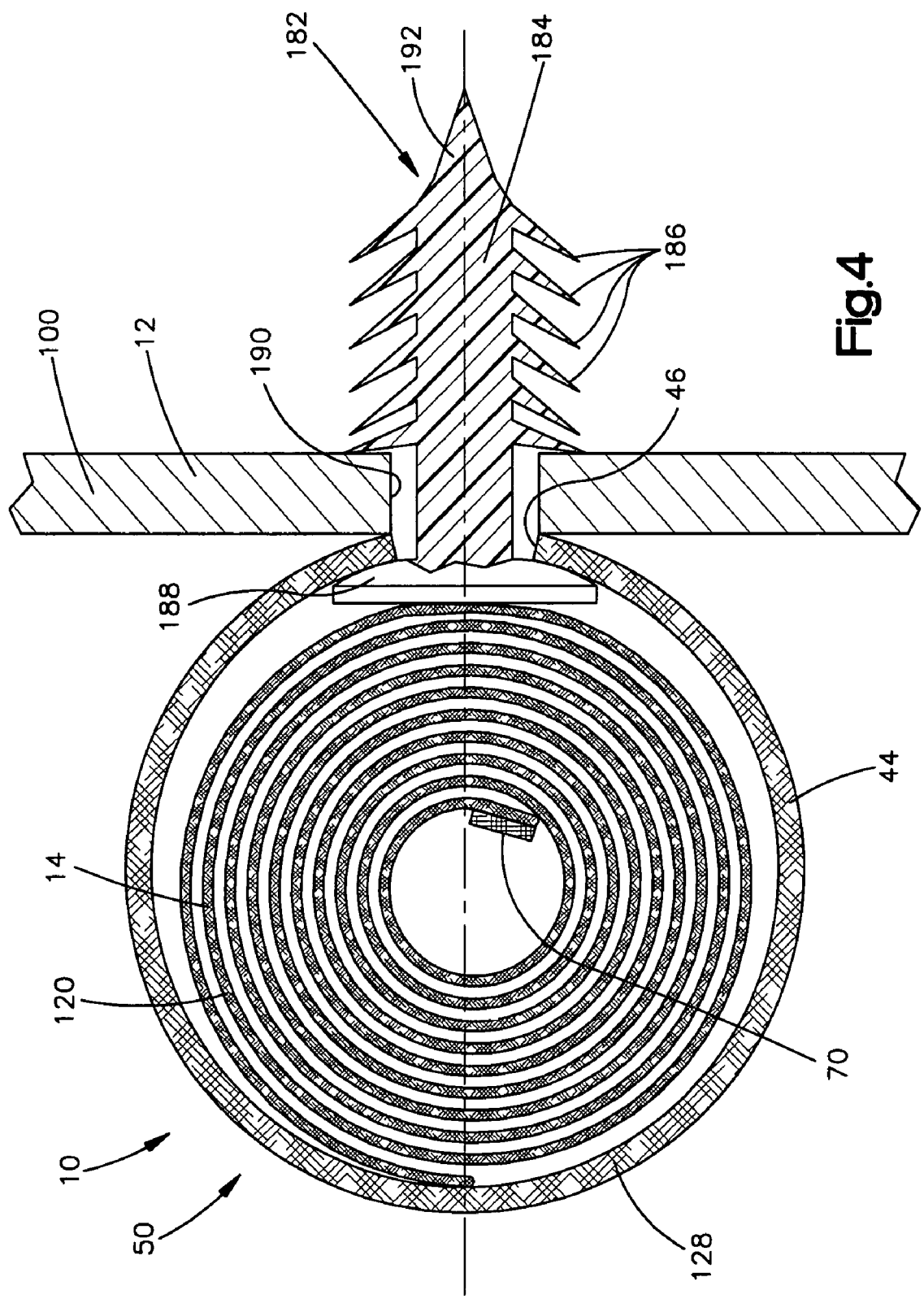
FIG. 4 is a sectional view taken generally along line 4-4 in FIG. 1.

Representative of the present invention, FIGS. 1 and 2 illustrate an apparatus 10 for helping to protect occupants 28 of a vehicle 12. The apparatus 10 includes an inflatable vehicle occupant protection device in the form of an inflatable curtain 14. The inflatable curtain 14 has a stored condition, shown in FIG. 1, in which the deflated curtain is rolled, folded, or rolled and folded, placed in a cover 44, and positioned adjacent the intersection of a side structure 16, including side window openings 20, and a roof 18 of the vehicle 12. The inflatable curtain 14 is inflatable from the stored position in a direction away from the roof 18 to a deployed position shown in FIG. 2. In the deployed position, the inflated curtain 14 extends along the side structure 16 and is positioned between the side structure and the occupants 28 of the vehicle 12.

The inflatable curtain 14 can be formed from any suitable material. For example, the inflatable curtain 14 may be formed from a fabric woven with nylon yarns (e.g., nylon 6-6 yarns). Also, the inflatable curtain 14 may have any suitable construction. For example, the inflatable curtain 14 may have a one piece woven (OPW) construction in which the curtain is woven as a single piece of material. As another example, the inflatable curtain 14 may be constructed by interconnecting fabric panels via suitable means, such as stitching, ultrasonic welding, heat bonding, or adhesives.

The inflatable curtain 14 may be uncoated, coated with a material, such as a gas impermeable urethane, or laminated with a material, such as a gas impermeable film. The inflatable curtain 14 thus may have a gas-tight or substantially gas-tight construction. Those skilled in the art will appreciate that alternative materials, such as polyester yarn, and alternative coatings, such as silicone, may also be used to construct the inflatable curtain 14.

The apparatus 10 also includes an inflation fluid source in the form of an inflator 24. The inflator 24 is actuatable to provide inflation fluid for inflating the inflatable curtain 14. The inflator 24 may be of any suitable construction or configuration. For example, the inflator 24 may contain a stored quantity of pressurized inflation fluid (not shown) in the form of a gas for inflating the inflatable curtain 14. As another example, the inflator 24 could contain a combination of pressurized inflation fluid and ignitable material for heating the inflation fluid, or could be a pyrotechnic inflator that uses the combustion of gas-generating material to generate inflation fluid. As a further example, the inflator 24 could be of any suitable type or construction for supplying a medium for providing inflation fluid for inflating the inflatable curtain 14.

In the embodiment illustrated in FIG. 1, the inflator 24 is connected in fluid communication with the inflatable curtain 14 through a conduit or fill tube 22. The fill tube 22 may be constructed of any suitable material, such as metal, plastic, or fabric. Alternatively, the fill tube 22 may be omitted and inflation fluid could be discharged into the inflatable curtain 14 from the inflator 24 directly or through a manifold.

The fill tube 22 may also have any suitable configuration. For example, the fill tube 22 may extend substantially along the entire length of the inflatable curtain 14, as shown in FIGS. 1 and 2. Alternatively, the fill tube 22 may extend along any portion of the length of the inflatable curtain 14. The portion of the fill tube 22 positioned in the inflatable curtain 14 includes a plurality of openings (not shown) through which inflation fluid is delivered to the curtain.

Referring to FIG. 2, the inflatable curtain 14 includes an upper edge 34, an opposite lower edge 36, and front and rear portions 60 and 62, respectively, that extend between the upper and lower edges. The inflatable curtain 14 further includes a main or curtain portion 122 and a sail portion 120 defined at the front portion 60 of the curtain. The sail portion 120 may be inflatable or non-inflatable. In the illustrated embodiment, the sail portion 120 is non-inflatable and the curtain portion 122 is inflatable.

The sail portion 120 may be a separate piece or pieces of material connected to the inflatable curtain 14 (e.g., by stitching or ultrasonic weld) or may be formed as an integral part of the curtain (e.g., in a OPW construction of the curtain). In the illustrated embodiment, the sail portion 120 is formed as a separate piece connected to the curtain portion 122 via stitching 124. The sail portion 120 has a generally triangular configuration and is arranged to both extend and converge the upper and lower edges 34 and 36 of the curtain 14.

As illustrated in FIG. 2, when the inflatable curtain 14 is inflated, the sail portion 120 is positioned generally forward of the occupant 28 of a front vehicle seat 78. The sail portion 120 is positioned adjacent the vehicle side structure 16 and overlies at least a portion of an A pillar 100 and the front side window opening 20 of the vehicle 12.

The apparatus 10 may be assembled for installation in the vehicle 12 as a unit. For example, the apparatus 10 may comprise an inflatable curtain module 50 that includes the inflator 24, the fill tube 22, the inflatable curtain 14, and the cover 44. The inflatable curtain module 50 is supported in the vehicle 12 by means 30, such as hooks or brackets, that connect the inflatable curtain 14, inflator 24, fill tube 22, or any combination thereof to the vehicle 12. For example, the brackets 30 may encircle and clamp onto the fill tube 22 and portions of the inflatable curtain 14.

The cover 44 (FIG. 1), which forms a part of the inflatable curtain module 50, helps support the inflatable curtain 14 in the stored condition. The cover 44 may have various constructions. For example, the cover 44 may have what is referred to as a "soft pack" construction. In one example of the soft pack construction, the cover 44 may comprise a sheet or panel of material, such as fabric, that is wrapped or otherwise placed around the inflatable curtain 14. Specifically, the cover 44 may be configured as a sock, sheath, or tube into which the inflatable curtain 14 and fill tube 22 are placed.

The fabric material used to construct the cover 44 may be a woven material, such as nylon or polyester, a non-woven material, such as a plastic film, or any other suitable material. The cover 44 may be constructed by interconnecting portions of the fabric material using known means, such as an adhesive, stitching, ultrasonic welding, or heat bonding. Alternatively, the cover 44 may have an OPW construction. Thus, for example, in the sock, sheath, or tubular construction, the cover 44 may be formed from a sheet of material with portions interconnected via ultrasonic welding. This construction is shown in FIGS. 3A and 3B.

Referring to FIGS. 3A and 3B, the cover 44 may comprise a main portion 130 for covering the curtain portion 122 of the inflatable curtain 14 and an extension portion 128 for covering the sail portion 120. As shown in FIG. 3A, the extension portion 128 may be somewhat narrower than the main portion 130. This may be done, for example, to help account for the smaller size (e.g., roll diameter) of the sail portion 120 in the stored condition. This may especially be the case where the sail portion 120 is formed as a non-inflatable single layer of material.

The cover 44 may also comprise a connecting portion 132 that connects the extension portion 128 to the main portion 130. The connecting portion 132 may be narrower than the extension portion 128. This may be done to provide increased flexibility of the cover 44 in the region between the main portion 130 and the extension portion 128. This increased flexibility may help facilitate easy manipulation of the inflatable curtain module 50 during installation in the vehicle 12.

As shown in FIG. 3A, the main portion 130 of the cover 44 may include openings 92 cut or otherwise formed along a first edge portion 86 of the cover. The openings 92 may have any desired configuration, such as the generally rectangular notched configuration shown in FIGS. 3A and 3B. The openings 92 may intersect the first edge portion 86 as shown in the illustrated embodiment. Alternatively, the openings 92 may be spaced from the first edge portion 86. In an assembled condition of the cover 44, shown in FIG. 3B, the first edge portion 86 is interconnected with an opposite second edge portion 88 by an ultrasonic weld 84. The ultrasonic weld 84 connects the edge portions 86 and 88 of both the main portion 130 and extension portion 128 of the cover 44. The ultrasonic weld 84 does not connect portions of the connecting portion 132. This places the main portion 130 and extension portion 128 of the cover 44 in a generally tubular configuration.

The cover 44 also includes a tear seam 126 that extends generally parallel to the first and second edge portions 86 and 88 of the cover. As shown in FIGS. 3A and 3B, the tear seam 126 may be positioned generally centrally between the first and second edge portions 86 and 88 (FIG. 3A) and radially opposite the ultrasonic weld 84 (FIG. 3B). The tear seam 126 may, for example, comprise perforations that weaken the tear strength of the cover 44 along the tear seam.

In order for the cover 44 to package the inflatable curtain 14 and help maintain the modular configuration of the inflatable curtain module 50, the cover 44 is placed over or around the rolled or folded inflatable curtain 14. The extension portion 128 covers the sail portion 120 of the inflatable curtain 14 and the main portion 130 at least substantially covers the curtain portion 122 of the curtain.

As shown in the embodiment illustrated in FIG. 2, the apparatus 10 may also include a flexible elongated member 70 that connects the sail portion 120 to the side structure 16 of the vehicle 12. The flexible elongated member 70 comprises a tether constructed of a material such as fabric. In the deflated condition (FIG. 1), a portion of the flexible elongated member 70 may be stored in the extension portion 128 of the cover 44.

The flexible elongated member 70 has a first end 72 and an opposite second end 74. The first end 72 of the flexible elongated member 70 is connected to the side structure 16 of the vehicle 12 forward of the sail portion 120, on or near the A pillar 100 of the vehicle 12. The second end 74 of the flexible elongated member 70 is secured to the sail portion 120 at or near a terminal front end of the sail portion by means (not shown) such as stitching.

According to the present invention, the apparatus 10 also includes one or more fasteners 182 for helping to secure the extension portion 128 of the cover 44 to the vehicle 12. In the illustrated embodiment, as best shown in FIG. 1, the apparatus 10 includes two such fasteners 182. Referring to FIG. 4, each fastener 182 may comprise a push-in fir tree type fastener.

The term "push-in" as used herein is meant to describe that an axially applied force is required to install the fastener, as opposed to a rotational force such as is used to install threaded fasteners, such as screws or bolts. The axial push-in force required to install the fastener 182 may be exerted manually without the use of tools, such as by applying an axial force via an installer's finger or thumb. A tool could, however, be employed to push in the fastener 182 in order to avoid fatigue or repetitive stress on the installer.

The term "fir tree" as used herein is meant to describe the physical appearance and configuration of the fastener 182, which resembles a fir tree in profile (see FIG. 4). The fir tree fastener 182 includes a head portion 188 with a generally round, flattened configuration that facilitates the push-in installation described above. A shaft portion 184 extends transversely from the head portion 188. The shaft 184 includes a pointed insertion end 192 opposite the head portion 188. The fir tree fastener 182 also includes a plurality of deflectable retainer members 186 that extend radially and at an acute angle from the shaft 184. The acute angle is generally toward the head portion 188 and away from the insertion end 192. The fastener 182 is constructed of a resilient material, such as plastic, so that the retainer members 186 tend to return to their normal or non-deflected state when a deflection force is removed.

The retainer members 186 may have various configurations. In a pronged configuration, the retainer members 186 may take on generally elongated linear configurations arranged in groups spaced along the shaft 184. In this configuration, each group includes a plurality of retainer members 186 spaced radially about the shaft 184. In a rimmed configuration, the retainer members 186 may take on a generally frusto-conical configuration extending radially about the shaft 184. In this configuration, single retainer members 186 are spaced axially along the length of the shaft 184. In the sectional view of FIG. 4, the retainer members 186 are representative of either the pronged or rimmed configuration.

Referring to FIG. 4, the fastener 182 extends through an opening 46 in the extension portion 128 of the cover 44 and through an aligned opening 190 in the side structure 16 of the vehicle 12. In the illustrated embodiment, the opening 190 is in the A-pillar 100. The fastener 182 thereby secures the sail portion 120 of the inflatable curtain 14 and the extension portion 128 of the cover 44 to the A pillar 100. The opening 46 in the extension portion 128 has a diameter smaller than that of the retainer members 186 and therefore forms an interference with the retainer members. This helps secure the fasteners 182 to the inflatable curtain module 50 prior to installation in the vehicle 12. Thus, by design, the fasteners 182 are maintained in a ready-to-install position, and the inflatable curtain module 50 can be shipped or otherwise provided in a ready-to-install condition.

When the fastener 182 is inserted and pushed into the opening 190 in the A pillar 100, the retainer members 186 deflect towards the shaft 184, thus allowing the fastener 182 to pass through the opening. Once through the opening 190, the retainer members 186 spring back toward their normal or non-deflected position due to the resilience of the material used to construct the fastener 182. If the fastener 182 is urged back out of the opening 190, such as by vibration of the vehicle 12 or a pull on the cover 44 in a direction away from the A-pillar 100, the retainer members 186 are deflected away from the shaft 184 and create an interference with the A-pillar. This helps prevent the fastener 182 from being pulled out of the opening 190. The fasteners 182 thus help maintain the sail portion 120 in the stored condition prior to inflation and deployment of the inflatable curtain 14.

Upon sensing the occurrence of an event for which inflation of the inflatable curtain 14 is desired, a sensor 150 provides an actuation signal to the inflator 24 via lead wires 152. Upon actuation of the inflator 24, inflation fluid is directed through the fill tube 22 into the inflatable curtain 14. The inflating curtain 14 ruptures the cover 44 along the tear seam 126 in both the main portion 130 and extension portion 128. The inflatable curtain 14 then inflates and deploys under the pressure of inflation fluid provided by the inflator 24 from the stored position of FIG. 1 to the deployed position of FIG. 2.

In the deployed position (FIG. 2), the inflatable curtain 14 is positioned between the side structure 16 and any occupants 28 of the vehicle 12. The inflatable curtain 14, when inflated, extends fore and aft in the vehicle 12 along the side structure 16 and may cover portions of the A pillar 100, a B pillar 102, and a C pillar 104 of the vehicle. In the illustrated embodiment (see FIG. 2), the curtain portion 122 is positioned between the occupants 28 and the side structure 16. The sail portion 120 extends forward from the curtain portion 122 to the A-pillar 100. The inflatable curtain 14 helps absorb impacts with the curtain and helps distribute the energy of impacts throughout a large area of the curtain.

Those skilled in the art will recognize that the configuration of the vehicle structure, and thus the spatial and interconnecting relationships between the vehicle structure (e.g., the side structure 16, roof 18, pillars 100, 102, and 104) and the components of the inflatable curtain module 50, may vary depending upon the particular design of the vehicle 12. Therefore, it will be appreciated that the vehicle structure illustrated in the Figures and the spatial and interconnecting relationships between the vehicle structure and the inflatable curtain module 50 are for illustrative purposes and may vary without departing from the spirit of the present invention.

From the above description of the invention, those skilled in the art will perceive applications, improvements, changes and modifications to the present invention. Such applications, improvements, changes and modifications within the skill of the art are intended to be covered by the appended claims.

Having described the invention, we claim the following:

1. An apparatus for helping to protect an occupant of a vehicle that has a side structure and a roof, the apparatus comprising:
   an inflatable vehicle occupant protection device inflatable away from the vehicle roof from a stored condition to a deployed condition positioned between the side structure and a vehicle occupant, the protection device comprising a curtain portion and a sail portion;
   a one-piece cover for at least partially enclosing the protection device in the stored condition, the cover comprising:
   a main portion for at least partially enclosing the curtain portion,
   an extension portion for at least partially enclosing the sail portion, and
   a connecting portion that connects the extension portion to the main portion, the connecting portion facilitating movement of the sail portion and the extension portion relative to the curtain portion and the main portion while the protection device is packaged in the cover; and
   at least one push-in fastener for securing the cover to the vehicle.

2. The apparatus recited in claim 1, wherein the at least one push-in fastener comprises a fir tree fastener.

3. The apparatus recited in claim 1, wherein the at least one push-in fastener comprises a head portion, a shaft portion extending transverse to the head portion, and a plurality of retainer members that extend at an acute angle from the shaft portion.

4. The apparatus recited in claim 3, wherein the shaft comprises an insertion end opposite the head portion, the retainer members extending at the acute angle in a direction away from the insertion end and toward the head portion.

5. The apparatus recited in claim 3, wherein the retainer members have a pronged configuration.

6. The apparatus recited in claim 5, wherein the pronged retainer members are arranged in groups spaced axially along the shaft portion, each group including a plurality of pronged retainer members spaced radially about the shaft portion.

7. The apparatus recited in claim 3, wherein the retainer members have a rimmed configuration.

8. The apparatus recited in claim 7, wherein the rimmed retainer members are spaced axially along the shaft portion, each rimmed retainer member having a frusto-conical configuration.

9. The apparatus recited in claim 3, wherein the at least one push-in fastener extends through an opening in the cover, the retainer members securing the at least one push-in fastener to the cover.

10. The apparatus recited in claim 1, wherein the at least one push-in fastener secures the extension portion of the cover to the vehicle.

11. The apparatus recited in claim 1, wherein the cover comprises a sheet of material with opposite longitudinal edge portions interconnected to maintain the cover in a tubular configuration, the connecting portion comprising a narrowed portion of the sheet in which the longitudinal edge portions are free from being interconnected.

12. The apparatus recited in claim 1, wherein the at least one push-in fastener connects the cover to an A pillar of the vehicle.

13. The apparatus recited in claim 1, wherein the cover comprises a sheet of material with opposite longitudinal edge portions interconnected by an ultrasonic weld to maintain the cover in a tubular configuration.

14. The apparatus of claim 1, further comprising:
   an inflation fluid source actuatable to provide inflation fluid for inflating the protection device;
   a fill tube having a portion located in the protection device, the fill tube directing inflation fluid from the inflator into the protection device to inflate the protection device; and
   at least one bracket connectable with at least one of the protection device, fill tube and cover,
   the protection device, cover, at least one push-in fastener, inflation fluid source, fill tube, and at least one bracket being assembled to form an inflatable curtain module capable of being installed in the vehicle as a unit.

15. An apparatus for helping to protect an occupant of a vehicle that has a side structure and a roof, the apparatus comprising:
   an inflatable vehicle occupant protection device comprising an inflatable curtain portion and a sail portion, the protection device being inflatable away from the vehicle roof from a stored condition to a deployed condition positioned between the side structure and a vehicle occupant;
   an inflation fluid source actuatable to provide inflation fluid for inflating the protection device; and
   a cover for at least partially enclosing the protection device in the stored condition, the cover comprising a main portion for at least partially enclosing the curtain portion and an extension portion at least partially enclosing the sail portion, the cover comprising a sheet of material having opposite longitudinal edge portions interconnected by an ultrasonic weld to give the cover a tubular configuration;
   wherein the cover further comprises a connecting portion that connects the extension portion to the main portion, the connecting portion comprising a portion of the sheet of material narrower than the main portion and extension portion, the connecting portion being free from the ultrasonic weld.

16. An apparatus for helping to protect an occupant of a vehicle that has a side structure and a roof, the apparatus comprising:
   an inflatable vehicle occupant protection device comprising an inflatable curtain portion and a sail portion, the protection device being inflatable away from the vehicle roof from a stored condition to a deployed condition positioned between the side structure and a vehicle occupant;
   an inflation fluid source actuatable to provide inflation fluid for inflating the protection device; and
   a cover for at least partially enclosing the protection device in the stored condition, the cover comprising a main portion for at least partially enclosing the curtain portion and an extension portion at least partially enclosing the sail portion, the cover comprising a sheet of material having opposite longitudinal edge portions interconnected by an ultrasonic weld to give the cover a tubular configuration;
   wherein the cover further comprises a connecting portion that connects the extension portion to the main portion, the connecting portion comprising a non-tubular portion of the cover deflectable to facilitate relative movement of the sail portion and extension portion relative to the curtain portion and main portion when the protection device is packaged in the cover.

* * * * *